United States Patent
Matsuda et al.

(10) Patent No.: US 12,240,537 B2
(45) Date of Patent: Mar. 4, 2025

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Satoshi Matsuda, Okazaki (JP); Isao Namikawa, Okazaki (JP); Koji Anraku, Okazaki (JP); Tomoyuki Iida, Nisshin (JP); Masaharu Yamashita, Toyota (JP); Kenji Shibata, Nagoya (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 318 days.

(21) Appl. No.: 17/872,508

(22) Filed: Jul. 25, 2022

(65) Prior Publication Data
US 2023/0033288 A1    Feb. 2, 2023

(30) Foreign Application Priority Data
Jul. 29, 2021    (JP) .................. 2021-124642

(51) Int. Cl.
*B62D 5/04*    (2006.01)
*B62D 6/00*    (2006.01)
*B62D 15/02*    (2006.01)

(52) U.S. Cl.
CPC ........... *B62D 5/046* (2013.01); *B62D 5/0409* (2013.01); *B62D 15/0225* (2013.01);
(Continued)

(58) Field of Classification Search
CPC .. B62D 5/046; B62D 5/0409; B62D 15/0225; B62D 15/0235; B62D 5/0469; B62D 6/008
(Continued)

(56) References Cited

U.S. PATENT DOCUMENTS 9,610,973 B2 *  4/2017  Tagami ............... B62D 5/0421
2019/0176874 A1  6/2019  Sanford et al.
2019/0351936 A1  11/2019  Anraku et al.

FOREIGN PATENT DOCUMENTS

EP    3 461 721 A2    4/2019
EP    3 715 219 A1    9/2020
(Continued)

OTHER PUBLICATIONS

Jan. 5, 2023 Extended European Search Report issued in European Patent Application No. 22187193.2.

*Primary Examiner* — Tiffany P Young
*Assistant Examiner* — Leah N Miller
(74) *Attorney, Agent, or Firm* — Oliff PLC

(57) ABSTRACT

A steering control device includes a base axial force calculator, a limiting axial force calculator, and a final axial force calculator. The limiting axial force calculator includes a steering angle holder, a reference angle calculator, a final difference calculator, and an axial force calculator. The steering angle holder is configured to hold a steering angle at the time of limiting a turning operation of the turning wheels when the turning operation is limited. The reference angle calculator is configured to calculate a reference angle. The final difference calculator is configured to calculate a final difference which is a final difference between the reference angle and the current steering angle. The axial force calculator is configured to calculate a limiting axial force based on a value of the final difference.

5 Claims, 5 Drawing Sheets

(52) U.S. Cl.
CPC ........ *B62D 15/0235* (2013.01); *B62D 5/0469* (2013.01); *B62D 6/008* (2013.01)

(58) Field of Classification Search
USPC ..................................................... 701/41, 36
See application file for complete search history.

(56) References Cited

FOREIGN PATENT DOCUMENTS

| | | | | |
|---|---|---|---|---|
| EP | 3782878 A1 * | 2/2021 | ............... | B62D 5/04 |
| JP | 2014133534 A * | 7/2014 | | |
| JP | 2017165219 A * | 9/2017 | ............... | B62D 5/04 |
| JP | 2019-199172 A | 11/2019 | | |
| JP | 7205344 B2 * | 1/2023 | ............. | B62D 5/006 |

* cited by examiner

STEERING CONTROL DEVICE

CROSS-REFERENCE TO RELATED APPLICATION

This application claims priority to Japanese Patent Application No. 2021-124642 filed on Jul. 29, 2021, incorporated herein by reference in its entirety.

BACKGROUND

1. Technical Field

The disclosure relates to a steering control device.

2. Description of Related Art

A steer-by-wire steering system in which a power transmission path between a steering wheel and turning wheels is cut off is known. This steering system includes a reaction motor, a turning motor, and a control device. The reaction motor generates a steering reaction force which is applied to a steering shaft. The turning motor generates a turning force for turning the turning wheels. When a vehicle is traveling, the control device generates a steering reaction force by controlling the reaction motor and turns the turning wheels by controlling the turning motor.

For example, a steering control device disclosed in Japanese Unexamined Patent Application Publication No. 2014-133534 (JP 2014-133534 A) calculates a regular reaction force based on a steering angle of a steering wheel, a turning angle of turning wheels, and a vehicle speed. The steering control device also calculates an end-contact reaction force based on the steering angle and the turning angle. The end-contact reaction force is a reaction force for giving a feeling of end contact of a steering mechanism to a driver. The steering control device calculates a final steering reaction force from the regular reaction force and the end-contact reaction force. The steering control device controls supply of electric power to a reaction motor such that the reaction motor generates the final steering reaction force.

Vibration may occur because a direction of the regular reaction force increasing with an increase of an absolute value of the steering angle or the turning angle is opposite to a direction of the end-contact reaction force increasing with an increase of a value of a difference between the absolute value of the turning angle and an upper-limit threshold value. Therefore, the steering control device disclosed in JP 2014-133534 A corrects at least one of the regular reaction force and the end-contact reaction force such that the absolute value of the regular reaction force decreases relatively when the direction of the regular reaction force is opposite to the direction of the end-contact reaction force. Accordingly, even when the direction of the regular reaction force is opposite to the direction of the end-contact reaction force, it is possible to curb occurrence of vibration.

SUMMARY

The steering control device disclosed in JP 2014-133534 A individually calculates the regular reaction force and the end-contact reaction force and performs a process of correcting at least one of the regular reaction force and the end-contact reaction force based on the directions of the calculated reaction forces. In this way, calculation of a plurality of reaction forces and performing of the process of adjusting the plurality of reaction forces serve as factors for hindering a decrease in calculational load of the steering control device. Therefore, there is demand for a decrease in calculational load in steering control devices according to the related art including the steering control device disclosed in JP 2014-133534 A.

An aspect of the disclosure provides a steering control device. The steering control device controls a reaction motor configured to generate a steering reaction force which is applied to a steering wheel of which a power transmission path to and from a turning shaft that turns turning wheels is cut off based on a command value which is calculated according to a steering state. The steering control device includes: a base axial force calculator configured to calculate a base axial force including an axial force in which a force acting on the turning shaft via at least the turning wheels is reflected when the steering wheel is operated in a predetermined operation range; a limiting axial force calculator configured to calculate a limiting axial force which is an axial force for virtually limiting an operation of the steering wheel; and a final axial force calculator configured to calculate a final axial force which is a final axial force to be reflected in the command value based on the base axial force and the limiting axial force. The limiting axial force calculator includes a steering angle holder, a reference angle calculator, a final difference calculator, and an axial force calculator. The steering angle holder is configured to hold a steering angle at the time of limiting a turning operation of the turning wheels when the turning operation is limited. The reference angle calculator is configured to calculate a reference angle by performing a limiting process of limiting the steering angle held by the steering angle holder to a virtual end angle when the turning operation of the turning wheels is limited. The reference angle calculator is configured to calculate the reference angle by performing the limiting process of limiting a current steering angle to the virtual end angle when the turning operation of the turning wheels is not limited. The virtual end angle corresponds to a limit position of a virtual operation range of the steering wheel. The final difference calculator is configured to calculate a final difference which is a final difference between the reference angle and the current steering angle. The axial force calculator is configured to calculate the limiting axial force based on a value of the final difference.

With this configuration, when the turning operation of the turning wheels is limited, the limiting axial force corresponding to the difference between the steering angle at that time and the current steering angle is calculated. By reflecting the limiting axial force in the final axial force or the command value, a driving force for virtually limiting the operation of the steering wheel is applied to a steering mechanism of the vehicle. Accordingly, a driver can recognize a situation in which the turning operation of the turning wheels is limited through a response from the steering wheel.

When the turning operation of the turning wheels is not limited and the steering wheel is operated over the virtual end angle, the limiting axial force corresponding to the difference between the current steering angle and the virtual end angle is calculated. By reflecting the limiting axial force in the final axial force or the command value, a driving force for virtually limiting the operation of the steering wheel is applied to a steering mechanism of the vehicle. Accordingly, a driver can recognize a situation in which the steering wheel is operated over the limit position of the virtual operation range through a response from the steering wheel.

Here, it is conceived that the limiting axial force for limiting an additional operation of the steering wheel and the limiting axial force for limiting the operation of the steering wheel over the virtual end angle be individually calculated when the turning operation of the turning wheels is limited. In this case, a process of adjusting the two limiting axial forces needs to be performed, for example, from a point of view of giving an appropriate feeling of steering to a driver.

In this regard, with this configuration, one of the limiting axial force for limiting the additional operation of the steering wheel and the limiting axial force for limiting the operation of the steering wheel over the virtual end angle in a situation in which the turning operation of the turning wheels is limited is calculated based on the difference between the reference angle calculated based on whether the turning operation of the turning wheels is limited and the current steering angle. That is, a part that calculates the limiting axial force for limiting the additional operation of the steering wheel and the limiting axial force for limiting the operation of the steering wheel over the virtual end angle in a situation in which the turning operation of the turning wheels is limited is shared. Accordingly, the process of adjusting the two limiting axial forces does not need to be performed. As a result, it is possible to decrease a calculational load when the two limiting axial forces are individually calculated.

In the steering control device, the final difference calculator may be configured to correct the calculated value of the final difference to a smaller value when the turning operation of the turning wheels is limited. When the turning wheels are going to be turned in a state in which the turning operation of the turning wheels is limited, a reaction force increases slowly with elastic deformation of tires. With this configuration, it is possible to more slowly increase a steering reaction by correcting the calculated value of the final difference to a smaller value. Accordingly, it is possible to apply a steering reaction force closer to that in an actual state in which the turning operation of the turning wheels is limited to the steering wheel.

In the steering control device, the final difference calculator may be configured to use the larger of the final difference calculated based on the premise that the turning operation of the turning wheels is limited and the final difference calculated based on the premise that a rotational position of the steering wheel has reached the limit position of the virtual operation range when the turning operation of the turning wheels is limited and the rotational position of the steering wheel reaches the limit position of the virtual operation range.

With this configuration, a steering reaction force corresponding to the final difference with the larger value of the final difference calculated based on the premise that the turning operation of the turning wheels is limited and the final difference calculated based on the premise that the rotational position of the steering wheel reaches the limit position of the virtual operation range can be applied to the steering wheel.

The steering control device may further include: a gain calculator configured to calculate a damping gain for the limiting axial force based on the value of the final difference calculated by the final difference calculator; and a multiplier configured to calculate a damping axial force to be reflected in the limiting axial force by multiplying the gain calculated by the gain calculator by a steering angular velocity.

As a gradient of the limiting axial force with respect to the final difference increases, the value of the limiting axial force is likely to change vibrationally with respect to the value of the final difference. With this configuration, it is possible to stabilize the value of the limiting axial force with respect to the final difference by reflecting the damping axial force in the limiting axial force.

The steering control device may further include a difference calculator configured to calculate a difference between a turning angle of the turning wheels at the time of limiting the turning operation and a current turning angle when the turning operation of the turning wheels is limited. The reference angle calculator may be configured to correct the steering angle held by the steering angle holder based on the value of the difference calculated by the difference calculator when the turning operation of the turning wheels is limited and to calculate the reference angle by performing the limiting process on the corrected steering angle.

Even when the turning operation of the turning wheels is limited, the turning wheels may be slightly turned. With this configuration, the steering angle held by the steering angle holder is corrected based on an amount of rotation of a shaft interlocking with the turning operation of the turning wheels. The reference angle is calculated based on the corrected steering angle. Accordingly, even when the turning wheels are turned in the state in which the turning operation of the turning wheels is limited, it is possible to apply a more appropriate steering reaction force to the steering wheel.

With the steering control device according to the disclosure, it is possible to decrease a calculational load.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
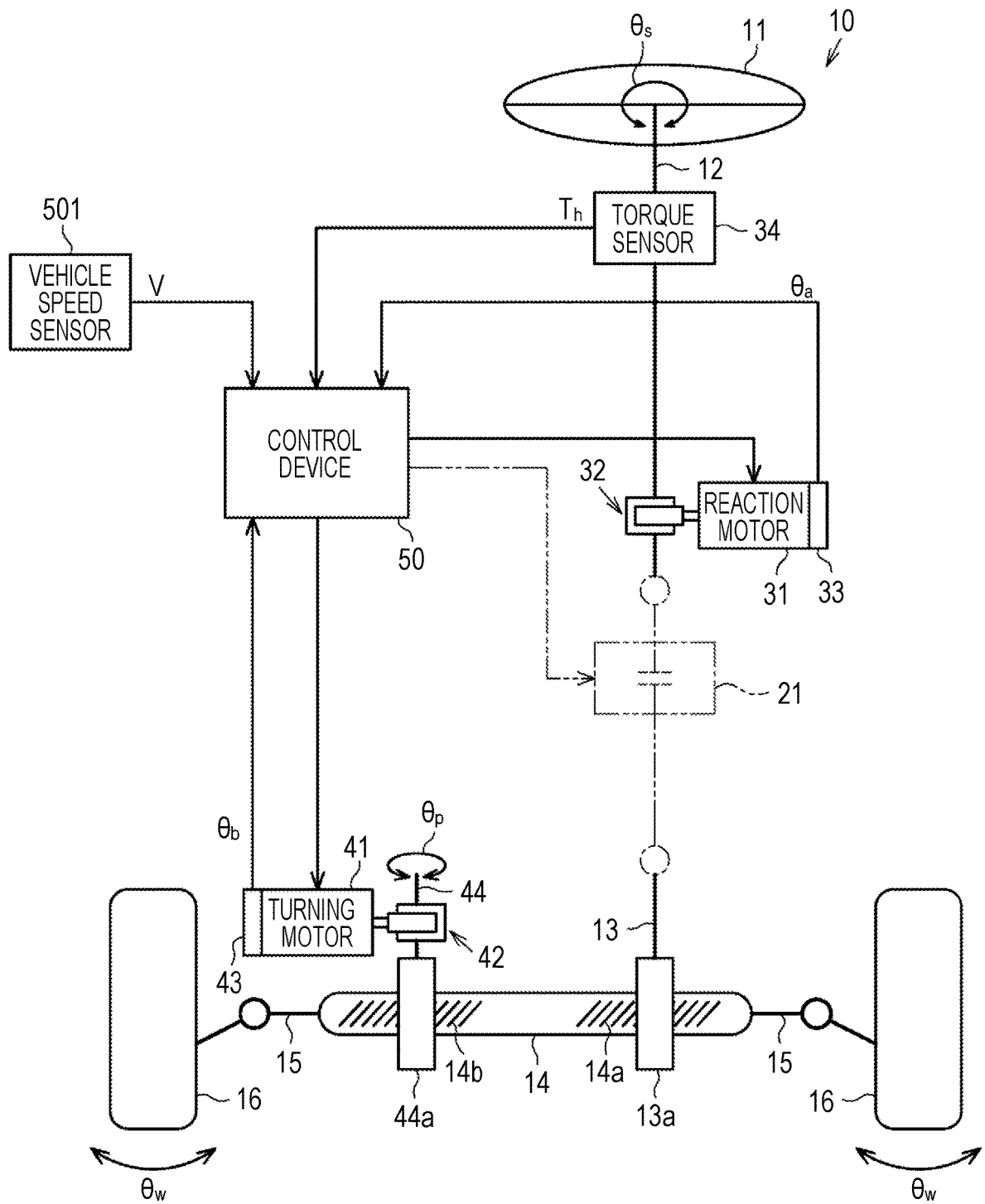
FIG. 1 is a diagram illustrating a configuration of a steer-by-wire steering system in which a steering control device according to an embodiment is mounted.

Hereinafter, a steering control device according to an embodiment will be described. As illustrated in FIG. 1, a steering system 10 of a vehicle includes a steering shaft 12 that is connected to a steering wheel 11. The steering system 10 includes a turning shaft 14 that extends in a vehicle width direction (in a right-left direction in FIG. 1). Right and left turning wheels 16 are connected to both ends of the turning shaft 14 via tie rods 15 and 15. When the turning shaft 14 moves linearly, a turning angle $\theta_w$ of the turning wheels 16 is changed. The steering shaft 12 and the turning shaft 14 constitute a steering mechanism of the vehicle.

The steering system 10 includes a reaction motor 31, a reduction gear mechanism 32, a rotation angle sensor 33, and a torque sensor 34 as a configuration for generating a steering reaction force. A steering reaction force is a force which acts in a direction opposite to an operating direction of the steering wheel 11 which is operated by a driver. An appropriate feeling of response can be given to the driver by applying the steering reaction force to the steering wheel 11.

The reaction motor 31 is a source of the steering reaction force. For example, a three-phase brushless motor may be employed as the reaction motor 31. A rotation shaft of the reaction motor 31 is connected to the steering shaft 12 via the reduction gear mechanism 32. A torque of the reaction motor 31 is applied as the steering reaction force to the steering shaft 12. The torque of the reaction motor 31 is a driving force that is applied to the steering shaft 12.

The rotation angle sensor 33 is provided in the reaction motor 31. The rotation angle sensor 33 detects a rotation angle $\theta_a$ of the reaction motor 31. The rotation angle $\theta_a$ of the reaction motor 31 is used to calculate a steering angle $\theta_s$. The reaction motor 31 and the steering shaft 12 interlock with each other via the reduction gear mechanism 32. Accordingly, the rotation angle $\theta_a$ of the reaction motor 31 and the rotation angle of the steering shaft 12, that is, the steering angle $\theta_s$ which is a rotation angle of the steering wheel 11, have a correlation therebetween. As a result, the steering angle $\theta_s$ can be calculated based on the rotation angle $\theta_a$ of the reaction motor 31.

The torque sensor 34 detects a steering torque $T_h$. The steering torque $T_h$ is a torque applied to the steering shaft 12 through a rotating operation of the steering wheel 11. The torque sensor 34 detects the steering torque $T_h$ applied to the steering shaft 12 based on an amount of torsion of a torsion bar which is provided in the middle of the steering shaft 12. The torque sensor 34 is provided in a part of the steering shaft 12 between the reduction gear mechanism 32 and the steering wheel 11.

The steering system 10 includes a turning motor 41, a reduction gear mechanism 42, and a rotation angle sensor 43 as a configuration for generating a turning force which is power for turning the turning wheels 16. The turning motor 41 is a source of the turning force. For example, a three-phase brushless motor may be employed as the turning motor 41. A rotation shaft of the turning motor 41 is connected to a pinion shaft 44 via the reduction gear mechanism 42. Pinion teeth 44a of the pinion shaft 44 engage with rack teeth 14b of the turning shaft 14. A torque of the turning motor 41 is applied as the turning force to the turning shaft 14 via the pinion shaft 44. The torque of the turning motor 41 is a driving force that is applied to the turning shaft 14. With rotation of the turning motor 41, the turning shaft 14 moves in the vehicle width direction which is the right-left direction in FIG. 1.

The rotation angle sensor 43 is provided in the turning motor 41. The rotation angle sensor 43 detects a rotation angle $\theta_b$ of the turning motor 41. The steering system 10 includes a pinion shaft 13. The pinion shaft 13 is provided to cross the turning shaft 14. Pinion teeth 13a of the pinion shaft 13 engage with the rack teeth 14a of the turning shaft 14. The reason the pinion shaft 13 is provided is that the turning shaft 14 along with the pinion shaft 44 is thus supported in a housing which is not illustrated. That is, by a support mechanism (not illustrated) which is provided in the steering system 10, the turning shaft 14 is supported to be movable in an axial direction thereof and is pressed toward the pinion shafts 13 and 44. Accordingly, the turning shaft 14 is supported in the housing. Another support mechanism that supports the turning shaft 14 in the housing without using the pinion shaft 13 may be provided.

The steering system 10 includes a control device 50. The control device 50 can be configured as a processing circuit including (1) one or more processors that operate in accordance with a computer program (software), (2) one or more dedicated hardware circuits such as an application-specific integrated circuit (ASIC) that perform at least some of various processes, or (3) a combination thereof. The processor includes a central processing unit (CPU). The processor includes memories such as a RAM and a ROM. The memories store program codes or commands configured to cause the CPU to perform processing. Memories, that is, non-transitory computer-readable media, include all available media that can be accessed by a general-purpose or dedicated computer. The control device 50 corresponds to a steering control device.

The control device 50 controls the reaction motor 31 and the turning motor 41 based on results of detection from various sensors which are provided in the vehicle. Examples of the sensors include a vehicle speed sensor 501 in addition to the rotation angle sensor 33, the torque sensor 34, and the rotation angle sensor 43. The vehicle speed sensor 501 detects a vehicle speed V.

The control device 50 performs reaction control such that a steering reaction force corresponding to the steering torque $T_h$ is generated through control of the reaction motor 31. The control device 50 calculates a target steering reaction force based on the steering torque $T_h$ and the vehicle speed V and calculates a steering reaction force command value based on the calculated target steering reaction force. The control device 50 supplies a current required for generating a steering reaction force corresponding to the steering reaction force command value to the reaction motor 31.

The control device 50 performs turning control such that the turning wheels 16 are turned according to a steering state through control of the turning motor 41. The control device 50 calculates a pinion angle $\theta_p$ which is an actual rotation angle of the pinion shaft 44 based on the rotation angle $\theta_b$ of the turning motor 41 detected by the rotation angle sensor 43. The pinion angle $\theta_p$ is a value in which a turning angle $\theta_w$ of the turning wheels 16 is reflected. The control device 50 calculates a steering angle $\theta_s$ based on the rotation angle $\theta_a$ of the reaction motor 31 detected by the rotation angle sensor 33 and calculates a target pinion angle which is a target value of the pinion angle $\theta_p$ based on the calculated steering angle $\theta_s$. The control device 50 calculates a difference between the target pinion angle and the actual pinion angle $\theta_p$, and controls supply of electric power to the turning motor 41 such that the difference is cancelled out.

Configuration of Control Device

Figure 2:
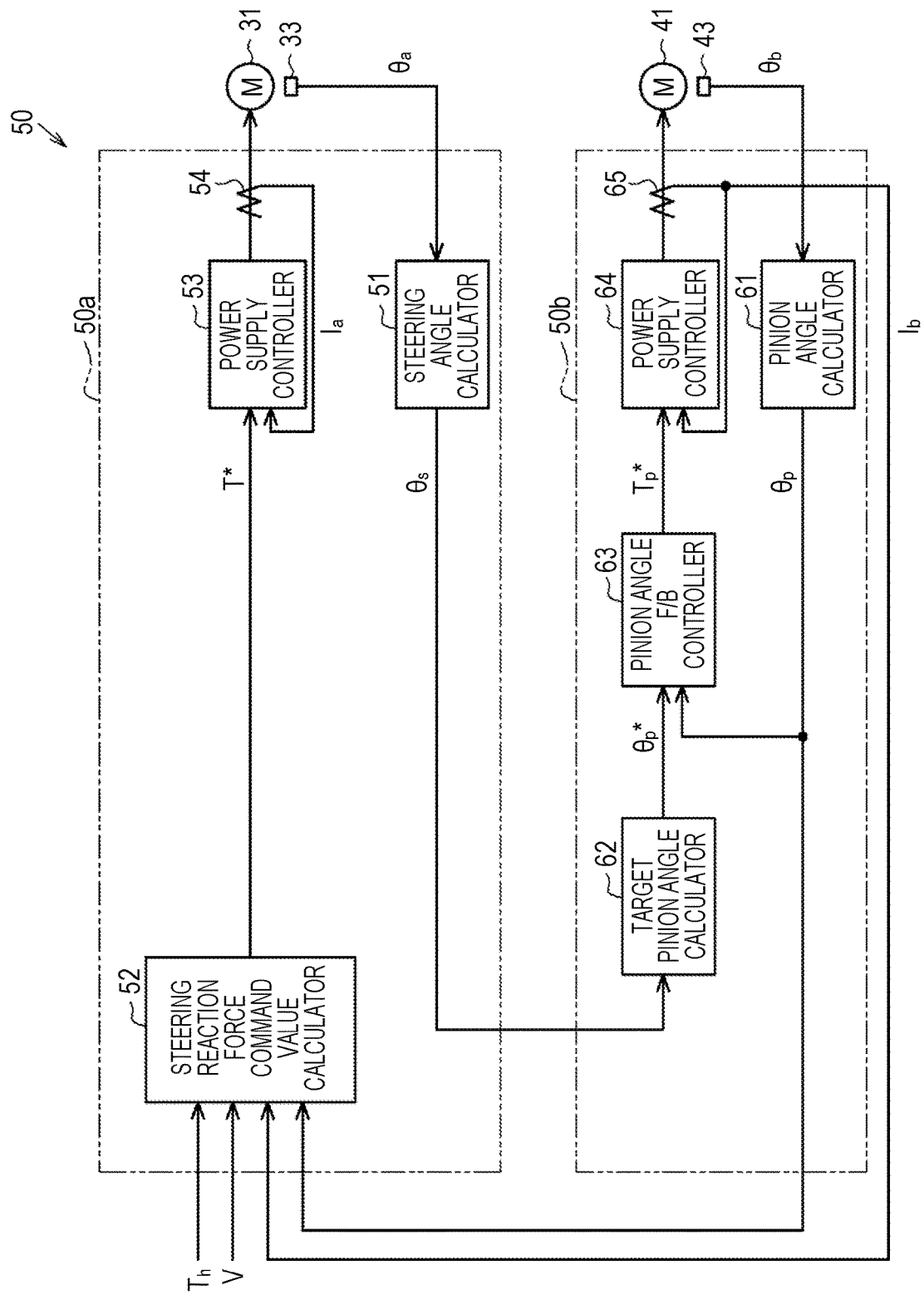
FIG. 2 is a block diagram of a control device according to the embodiment.

A configuration of the control device 50 will be described below. As illustrated in FIG. 2, the control device 50 includes a reaction controller 50a that performs reaction control and a turning controller 50b that performs turning control.

The reaction controller 50a includes a steering angle calculator 51, a steering reaction force command value calculator 52, and a power supply controller 53. The steering angle calculator 51 calculates the steering angle $\theta_s$ of the steering wheel 11 based on the rotation angle $\theta_a$ of the reaction motor 31 detected by the rotation angle sensor 33.

The steering reaction force command value calculator 52 calculates a steering reaction force command value T* based on the steering torque $T_h$ and the vehicle speed V. The steering reaction force command value calculator 52 calculates the steering reaction force command value T* such that an absolute value thereof becomes larger as an absolute value of the steering torque $T_h$ becomes larger and the vehicle speed V becomes less. The steering reaction force command value calculator 52 will be described later in detail.

The power supply controller 53 supplies electric power corresponding to the steering reaction force command value T* to the reaction motor 31. Specifically, the power supply controller 53 calculates a current command value for the reaction motor 31 based on the steering reaction force command value T*. The power supply controller 53 detects a value of an actual current $I_a$ which is generated in a power supply path for the reaction motor 31 using a current sensor 54 provided in the power supply path. The value of the current $I_a$ is a value of an actual current which is supplied to the reaction motor 31. The power supply controller 53 calculates a difference between the current command value and the value of the actual current $I_a$ and controls supply of electric power to the reaction motor 31 such that the difference is cancelled out. Accordingly, the reaction motor 31 generates a torque corresponding to the steering reaction force command value T*. As a result, it is possible to give an appropriate feeling of response based on a road reaction force to a driver.

The turning controller 50b includes a pinion angle calculator 61, a target pinion angle calculator 62, a pinion angle feedback controller 63, and a power supply controller 64. The pinion angle calculator 61 calculates the pinion angle $\theta_p$ which is an actual rotation angle of the pinion shaft 44 based on the rotation angle $\theta_b$ of the turning motor 41 detected by the rotation angle sensor 43. The turning motor 41 and the pinion shaft 44 interlink with each other via the reduction gear mechanism 42. Accordingly, there is a correlation between the rotation angle $\theta_b$ of the turning motor 41 and the pinion angle $\theta_p$. The pinion angle $\theta_p$ can be calculated from the rotation angle $\theta_b$ of the turning motor 41 using the correlation. The pinion shaft 44 engages with the turning shaft 14. Accordingly, there is also a correlation between the pinion angle $\theta_p$ and an amount of movement of the turning shaft 14. That is, the pinion angle $\theta_p$ is a value in which the turning angle $\theta_w$ of the turning wheels 16 is reflected.

The target pinion angle calculator 62 calculates a target pinion angle $\theta_p{}^*$ based on the steering angle $\theta_s$ calculated by the steering angle calculator 51. In this embodiment, the target pinion angle calculator 62 sets the target pinion angle $\theta_p{}^*$ to the same value as the steering angle $\theta_s$. That is, a steering angle ratio which is a ratio of the turning angle $\theta_w$ to the steering angle $\theta_s$ is "1:1."

In addition, the target pinion angle calculator 62 may set the target pinion angle $\theta_p{}^*$ to a value different from the steering angle $\theta_s$. That is, the target pinion angle calculator 62 sets the steering angle ratio which is a ratio of the turning angle $\theta_w$ to the steering angle $\theta_s$ according to a traveling state of the vehicle such as the vehicle speed V, and calculates the target pinion angle $\theta_p{}^*$ based on the set steering angle ratio. The target pinion angle calculator 62 calculates the target pinion angle $\theta_p{}^*$ such that the turning angle $\theta_w$ relative to the steering angle $\theta_s$ becomes larger as the vehicle speed V becomes lower and the turning angle $\theta_w$ relative to the steering angle $\theta_s$ becomes less as the vehicle speed V becomes higher. In order to realize the steering angle ratio which is set according to the traveling state of the vehicle, the target pinion angle calculator 62 calculates a corrected angle for the steering angle $\theta_s$ and calculates the target pinion angle $\theta_p{}^*$ based on the steering angle ratio by adding the calculated corrected angle to the steering angle $\theta_s$.

The pinion angle feedback controller 63 receives the target pinion angle $\theta_p{}^*$ calculated by the target pinion angle calculator 62 and the actual pinion angle $\theta_p$ calculated by the pinion angle calculator 61. The pinion angle feedback controller 63 calculates a pinion angle command value $T_p{}^*$ through feedback control of the pinion angle $\theta_p$ such that the actual pinion angle $\theta_p$ conforms to the target pinion angle $\theta_p{}^*$.

The power supply controller 64 supplies electric power corresponding to the pinion angle command value $T_p{}^*$ to the turning motor 41. Specifically, the power supply controller 64 calculates a current command value for the turning motor 41 based on the pinion angle command value $T_p{}^*$. The power supply controller 64 detects a value of an actual current $I_b$ which is generated in a power supply path for the turning motor 41 using a current sensor 65 provided in the power supply path. The value of the current $I_b$ is a value of an actual current supplied to the turning motor 41. The power supply controller 64 calculates a difference between the current command value and the value of the actual current $I_b$ and controls supply of electric power to the turning motor 41 such that the difference is cancelled out. Accordingly, the turning motor 41 rotates by an angle corresponding to the pinion angle command value $T_p{}^*$.

Configuration of Steering Reaction Force Command Value Calculator

Figure 3:
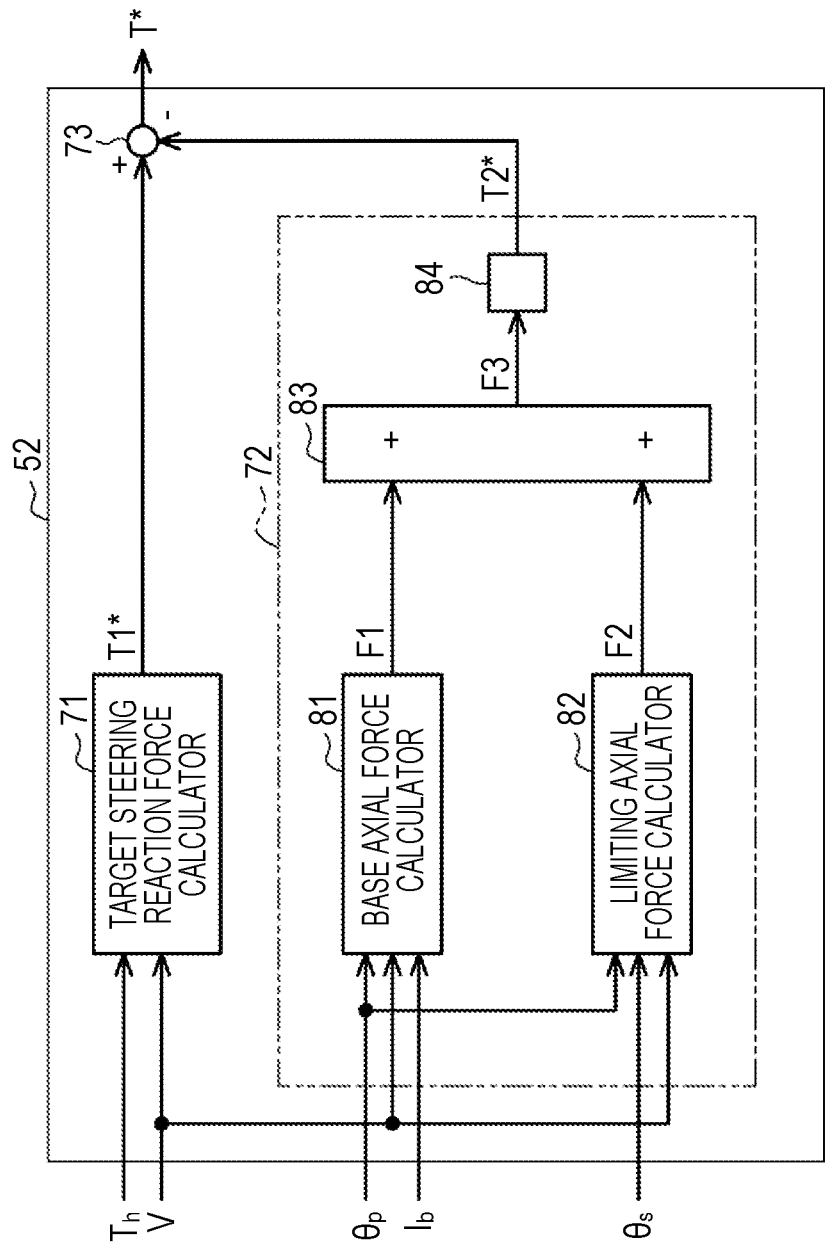
FIG. 3 is a block diagram of a steering reaction force command value calculator according to the embodiment.

The configuration of the steering reaction force command value calculator 52 will be described below. As illustrated in FIG. 3, the steering reaction force command value calculator 52 includes a target steering reaction force calculator 71, an axial force calculator 72, and a subtractor 73.

The target steering reaction force calculator 71 calculates a target steering reaction force T1* based on the steering torque $T_h$ and the vehicle speed V. The target steering reaction force T1* is a target value of a torque which acts in a direction opposite to the operating direction of the steering wheel 11 and which is to be generated from the reaction motor 31. The target steering reaction force calculator 71 calculates the target steering reaction force T1* such that an absolute value thereof becomes larger as the absolute value of the steering torque $T_h$ becomes larger and the vehicle speed V becomes lower.

The axial force calculator 72 calculates an axial force acting on the turning shaft 14 via the turning wheels 16 based on the pinion angle $\theta_p$, the value of the current $I_b$ of the turning motor 41, and the vehicle speed V, and calculates a converted torque value (a steering reaction force corresponding to the axial force) T2* which is obtained by converting the calculated axial force to a torque.

The subtractor 73 calculates the steering reaction force command value T* by subtracting the converted torque value T2* calculated by the axial force calculator 72 from the target steering reaction force T1* calculated by the target steering reaction force calculator 71.

Configuration of Axial Force Calculator

The configuration of the axial force calculator 72 will be described below in detail. The axial force calculator 72 includes a base axial force calculator 81, a limiting axial force calculator 82, an adder 83, and a converter 84.

The base axial force calculator 81 calculates a base axial force F1 which is a basic axial force acting on the turning shaft 14 via the turning wheels 16. The base axial force F1 is one of the following three axial forces (A1) to (A3).

(A1) Angle Axial Force

An angle axial force is, for example, an axial force corresponding to the pinion angle $\theta_p$. The base axial force calculator 81 calculates an angle axial force based on the pinion angle $\theta_p$. The base axial force calculator 81 calculates an angle axial force such that its value becomes larger as the absolute value of the pinion angle $\theta_p$ becomes larger and the vehicle speed V becomes lower. The absolute value of the angle axial force increases linearly with an increase of the absolute value of the pinion angle $\theta_p$. The angle axial force is set to the same sign as the sign of the pinion angle $\theta_p$. The angle axial force is an axial force in which a road surface state or a force acting on the turning shaft 14 via the turning wheels 16 is not reflected.

(A2) Current Axial Force

A current axial force is an axial force corresponding to the value of the current $I_b$ of the turning motor 41. The base axial force calculator 81 calculates the current axial force based on the value of the current $I_b$ of the turning motor 41. The value of the current $I_b$ of the turning motor 41 changes according to a difference between the target pinion angle $\theta_p$ and the actual pinion angle $\theta_p$ due to a disturbance corresponding to the road surface state such as a road-surface frictional resistance acting on the turning wheels 16. That is, an actual road surface state acting on the turning wheels 16 is reflected in the value of the current $I_b$ of the turning motor 41. Accordingly, it is possible to calculate an axial force in which an influence of the road surface state is reflected based on the value of the current $I_b$ of the turning motor 41. The base axial force calculator 81 calculates the current axial force, for example, by multiplying the value of the current $I_b$ of the turning motor 41 by a gain which is a coefficient corresponding to the vehicle speed V. The current axial force is an axial force in which a road surface state or a force acting on the turning shaft 14 via the turning wheels 16 is reflected.

(A3) Mixed Axial Force

A mixed axial force is an axial force in which the angle axial force and the current axial force are mixed at a predetermined ratio. The base axial force calculator 81 individually sets distribution proportions for the angle axial force and the current axial force based on various state variables in which vehicle behavior, a road surface state, or a steering state is reflected. The base axial force calculator 81 calculates the mixed axial force by summing values obtained by multiplying the angle axial force and the current axial force by the individually set distribution proportions.

The limiting axial force calculator 82 calculates a limiting axial force F2 for virtually limiting the operation range of the steering wheel 11. The limiting axial force F2 is at least one of the following two axial forces (B1) and (B2).

(B1) End Axial Force

An end axial force is calculated based on a point of view of rapidly increasing a torque in a direction opposite to the steering direction generated from the reaction motor 31 when an operation position of the steering wheel 11 approaches a limit position of an operation range or when the turning shaft 14 approaches a limit position of a physical movable range thereof. The limit position of the operation range of the steering wheel 11 is determined, for example, based on a length of a spiral cable provided in the steering wheel 11. The limit position of the physical movable range of the turning shaft 14 is a position at which a movable range of the turning shaft 14 is physically limited due to occurrence of a so-called end contact in which a rack end which is an end of the turning shaft 14 contacts a housing (not illustrated). The limiting axial force calculator 82 calculates an end axial force, for example, based on the pinion angle $\theta_p$ and the steering angle $\theta_s$.

(B2) Curbstone Axial Force

A curbstone axial force is, for example, an axial force for transmitting a situation in which the turning wheels 16 are in contact with an obstacle such as a curbstone to a driver through a steering reaction force when the vehicle starts in a stopped state. The curbstone axial force is calculated based on a point of view of rapidly increasing a torque in a direction opposite to the steering direction which is generated from the reaction motor 31 in order to limit additional turn steering or return steering in the situation in which the turning wheels 16 are in contact with an obstacle. The limiting axial force calculator 82 determines whether the turning wheels 16 are in contact with an obstacle such as a curbstone. The limiting axial force calculator 82 calculates the curbstone axial force, for example, based on the steering angle $\theta_s$ when it is determined that the turning wheels 16 are in contact with an obstacle such as a curbstone.

The adder 83 calculates a final axial force F3 by summing the base axial force F1 calculated by the base axial force calculator 81 and the limiting axial force F2 calculated by the limiting axial force calculator 82. The final axial force F3 is a final axial force used to calculate the steering reaction force command value T*. The adder 83 corresponds to a final axial force calculator.

The converter 84 calculates a converted torque value T2* by converting the final axial force F3 calculated by the adder 83 to a torque. Here, it is conceived that the limiting axial force calculator 82 employs a configuration for individually calculating both the limiting axial force F2 which is an end axial force and the limiting axial force F2 which is a curbstone axial force. However, when this configuration is employed, a process of adjusting the end axial force and the curbstone axial force may need to be performed. Depending on product specifications or the like, it is conceived that an axial force with the larger absolute value of the end axial force and the curbstone axial force is selected as the limiting axial force F2 to curb calculation of the final axial force F3 with an excessive value. In order to give a more appropriate feeling of steering to a driver, it can also be conceived that at least one value of the base axial force F1 and the limiting axial force F2 is adjusted according to the steering state or the traveling state of the vehicle.

There is demand for a decrease in calculational load in the control device 50. In this regard, one reason the decrease in calculational load of the limiting axial force calculator 82 is hindered is that the limiting axial force calculator 82 individually calculates both the end axial force and the curbstone axial force and performs the process of adjusting the end axial force and the curbstone axial force. There is concern about an increase in calculational load of the limiting axial force calculator 82.

Figure 4:
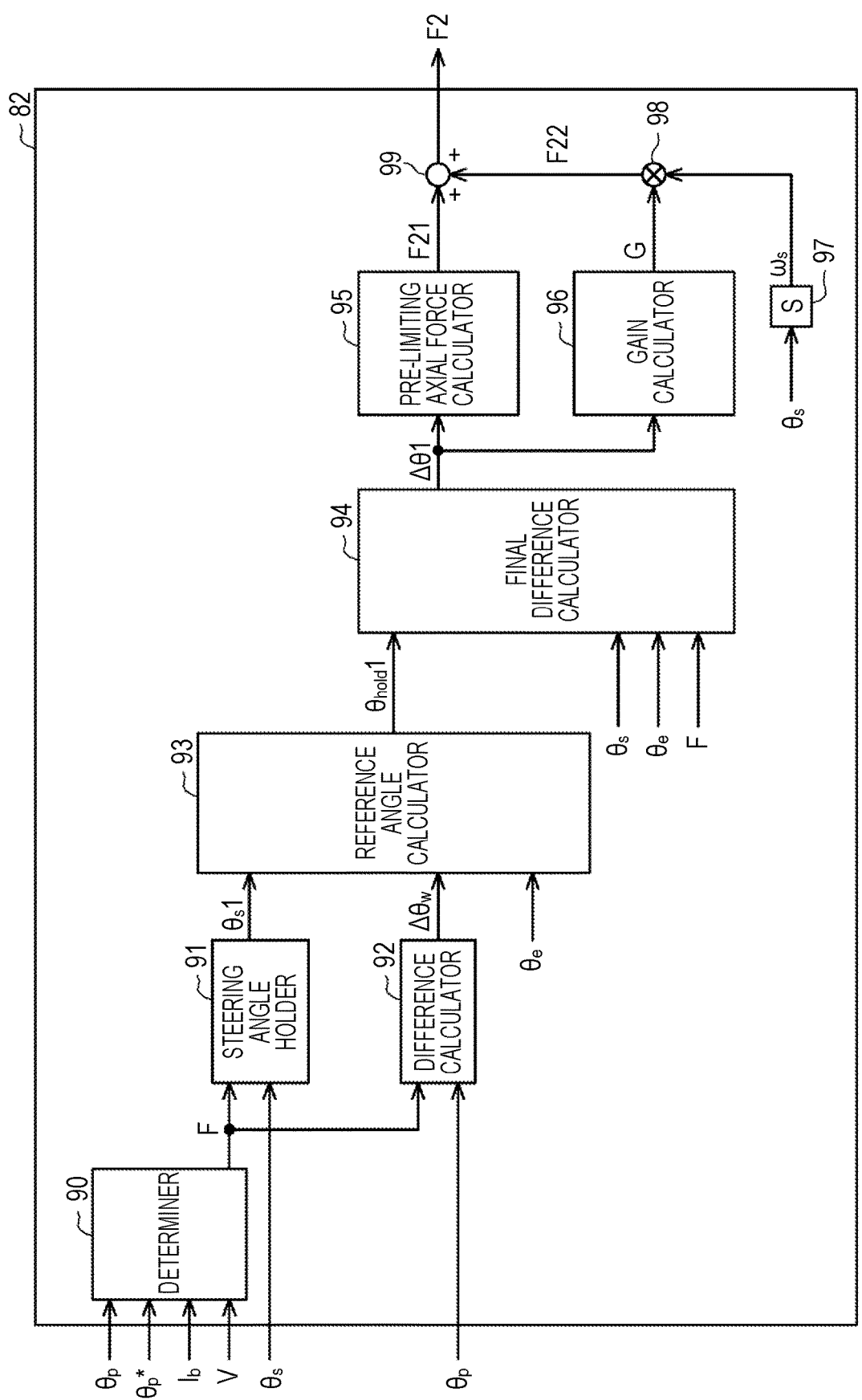
FIG. 4 is a control block diagram of a limiting axial force calculator according to the embodiment.

Therefore, in this embodiment, the limiting axial force calculator 82 employs the following configuration. As illustrated in FIG. 4, the limiting axial force calculator 82 includes a determiner 90, a steering angle holder 91, a difference calculator 92, a reference angle calculator 93, a final difference calculator 94, a pre-limiting axial force calculator 95, a gain calculator 96, a differentiator 97, a multiplier 98, and an adder 99.

The determiner 90 determines whether the turning wheels 16 are in contact with an obstacle such as a curbstone. For example, when all the following four determination conditions (C1) to (C4) are satisfied, the determiner 90 determines that the turning wheels 16 are in contact with an obstacle such as a curbstone.

$$|\Delta\theta_p(=|\theta_p^*-\theta_p|)|>\theta_{pth} \quad (C1)$$

$$|I_b|>I_{th} \quad (C2)$$

$$|\omega_p|<\omega_{th} \quad (C3)$$

$$|V|<V_{th} \quad (C4)$$

In the determination condition (C1), "$\theta_p{}^*$" denotes a target pinion angle calculated by the target pinion angle calculator 62. "$\theta_p$" denotes a pinion angle calculated by the pinion angle calculator 61. "$\Delta\theta_p$" is an angle difference acquired by subtracting the actual pinion angle $\theta_p$ from the target pinion angle $\theta_p{}^*$. "$\theta_{pth}$" denotes an angle difference threshold value. The angle difference threshold value $\theta_{pth}$ is set based on the following point of view. That is, when the turning wheels 16 are in contact with an obstacle, it is difficult to turn the turning wheels 16 to an additional turn steering side or a return steering side. When the steering wheel 11 is steered to the additional turn steering side or the return steering side in this state, the target pinion angle $\theta_p{}^*$ increases with the steering, and the turning angle $\omega_w$ or the pinion angle $\theta_p$ is maintained at a fixed value. Accordingly, in the situation in which the turning wheels 16 are in contact with an obstacle, as the turning wheels 16 are going to be additionally turned, the difference between the target pinion angle $\theta_p{}^*$ and the pinion angle $\theta_p$ increases. Accordingly, it can be said that there is a higher likelihood that the turning wheels 16 are in contact with an obstacle as the absolute value of the angle difference $\Delta\theta_p$ increases. As a result, the angle difference $\Delta\theta_p$ is a value indicating a probability of the situation in which the turning wheels 16 are in contact with an obstacle. Based on this point of view, the angle difference threshold value $\theta_{pth}$ is set by experiment or simulation in consideration of tolerance due to noise of the rotation angle sensor 43 or the like.

In the determination condition (C2), "$I_b$" denotes the value of the current $I_b$ of the turning motor 41. "$I_{th}$" denotes a current threshold value. The current threshold value $I_{th}$ is set based on the following point of view. That is, in the situation in which the turning wheels 16 are in contact with an obstacle, the absolute value of the current $I_b$ of the turning motor 41 increases as the turning wheels 16 are going to be additionally turned. Accordingly, it can be said that there is a higher likelihood that the turning wheels 16 are in contact with an obstacle as the absolute value of the current $I_b$ of the turning motor 41 becomes larger. Accordingly, the value of the current $I_b$ of the turning motor 41 is also a value indicating a probability of the situation in which the turning wheels 16 are in contact with an obstacle. Based on this point of view, the current threshold value $I_{th}$ is set by experiment or simulation.

In the determination condition (C3), "$\omega_p$" denotes a pinion angular velocity and is acquired by differentiating the pinion angle $\theta_p$. "$\omega_{th}$" denotes an angular velocity threshold value. The angular velocity threshold value $\omega_{th}$ is set based on the following point of view. That is, in the situation in which the turning wheels 16 are in contact with an obstacle, it is difficult to turn the turning wheels 16. Accordingly, it can be said that there is a higher likelihood that the turning wheels 16 are in contact with an obstacle as a turning speed of the turning wheels 16 becomes lower and the absolute value of the pinion angular velocity $\omega_p$ becomes lower. Accordingly, the pinion angular velocity $\omega_p$ is also a value indicating a probability of the situation in which the turning wheels 16 are in contact with an obstacle. Based on this point of view, the pinion angular velocity $\omega_p$ is set by experiment or simulation in consideration of tolerance due to noise of the rotation angle sensor 43 or the like.

In the determination condition (C4), "V" denotes a vehicle speed detected by the vehicle speed sensor 501. "$V_{th}$" denotes a vehicle speed threshold value serving as a reference for determining whether the vehicle is traveling at a low speed. The vehicle speed threshold value $V_{th}$ is set using the vehicle speed V in a low speed range (0 km/h to lower than 40 km/h) and is set, for example, to "40 km/h." The vehicle speed threshold value $V_{th}$ is set based on a point of view of determining whether the turning wheels 16 are in contact with an obstacle or whether a current traveling state is a traveling state in which a driver is properly notified that the turning wheels 16 are in contact with an obstacle by rapidly changing the steering reaction force.

The determiner 90 sets a value of a flag F based on a result of determination of whether the turning wheels 16 are in contact with an obstacle. When it is determined that the turning wheels 16 are not in contact with an obstacle, that is, when at least one condition of the four determination conditions (C1) to (C4) is not satisfied, the determiner 90 sets the value of the flag F to "0." When it is determined that the turning wheels 16 are in contact with an obstacle, that is, when all of the four determination conditions (C1) to (C4) are satisfied, the determiner 90 sets the value of the flag F to "1."

The steering angle holder 91 receives the value of the flag F set by the determiner 90 and the steering angle $\theta_s$ calculated by the steering angle calculator 51. When the determiner 90 determines that the turning wheels 16 are in contact with an obstacle, that is, when the value of the flag F set by the determiner 90 is "1," the steering angle holder 91 holds the steering angle $\theta_s$ at that time as a curbstone-determination steering angle $\theta_s1$ as expressed by the following expression (D1). This is for using the curbstone-determination steering angle $\theta_s1$ as a generation start position of the curbstone axial force to generate the curbstone axial force corresponding to a change of the steering angle $\theta_s$ with respect to the curbstone-determination steering angle $\theta_s1$. When the determiner 90 determines that the turning wheels 16 are not in contact with an obstacle, that is, the value of the flag F set by the determiner 90 is "0," the steering angle holder 91 does not hold the steering angle $\theta_s$. The steering angle holder 91 supplies the steering angle $\theta_s$ at that time as a non-curbstone-determination steering angle $\theta_s1$ to the reference angle calculator 93. That is, when the value of the flag F is "0," the steering angle $\theta_s1$ has the same value as the steering angle $\theta_s$ at that time.

$$\theta_{s1} = \theta_s \quad (D1)$$

The difference calculator 92 receives the value of the flag F set by the determiner 90 and the pinion angle $\theta_p$ calculated by the pinion angle calculator 61. The pinion angle $\theta_p$ is a value in which the turning angle $\theta_w$ of the turning wheels 16 is reflected. When the value of the flag F set by the determiner 90 is "1," the difference calculator 92 holds the turning angle $\theta_w$ at that time as a curbstone-determination turning angle $\theta_w1$ as expressed by the following expression (D2). In addition, the difference calculator 92 can calculate the turning angle $\theta_w$ based on the pinion angle $\theta_p$.

$$\theta_w1 = \theta_w \quad (D2)$$

When the value of the flag F set by the determiner 90 is "1," the difference calculator 92 calculates a difference $\Delta\theta_w$ between the curbstone-determination turning angle $\theta_w1$ and the current turning angle $\theta_w$ as expressed by the following expression (D3). This is for updating the generation start position of the curbstone axial force, that is, the curbstone-determination steering angle $\theta_s1$, by a change of the turning angle $\theta_w$ from the curbstone-determination turning angle $\theta_w1$.

$$\Delta\theta_w = \theta_w - \theta_w1 \quad (D3)$$

When the value of the flag F set by the determiner 90 is "0," the difference calculator 92 does not hold the value of the turning angle $\theta_w$. When the value of the flag F is "0," the difference calculator 92 does not calculate the difference $\Delta\theta_w$ based on Expression (D3).

The reference angle calculator 93 receives the curbstone-determination or non-curbstone-determination steering angle $\theta_s 1$ from the steering angle holder 91, the difference $\Delta\theta_w$ calculated by the difference calculator 92, and a virtual end angle $\theta_e$ stored in a storage device of the control device 50. The virtual end angle $\theta_e$ is the steering angle $\theta_s$ corresponding to the limit position of the virtual operation range of the steering wheel 11 or the pinion angle $\theta_p$ corresponding to the limit position of the virtual operation range of the turning shaft 14. The virtual end angle $\theta_e$ is set based on a value near the steering angle $\theta_s$ when the rotational position of the steering wheel 11 reaches the limit position of the virtual operation range thereof or a value near the pinion angle $\theta_p$ when the turning shaft 14 reaches the limit position of the operation range thereof.

The limiting axial force calculator 82 may include a calculator configured to calculate the virtual end angle $\theta_e$ based on the vehicle speed V. For example, this calculator calculates the virtual end angle $\theta_e$ such that an absolute value thereof becomes less as the vehicle speed V becomes higher.

The reference angle calculator 93 calculates a reference angle $\theta_{hold}$ by adding the difference $\Delta\theta_w$ to an input steering angle $\theta_s 1$ when the curbstone-determination steering angle $\theta_s 1$ is input as expressed by the following expression (D4). The reference angle $\theta_{hold}$ is a value acquired by updating the curbstone-determination steering angle $\theta_s 1$ by a change of the turning angle $\theta_w$ from the curbstone-determination turning angle $\theta_w 1$.

$$\theta_{hold}=\theta_s 1+\Delta\theta_w \quad (D4)$$

In addition, when the non-curbstone-determination steering angle $\theta_s 1$ is input, the reference angle calculator 93 sets the input steering angle $\theta_s 1$ as the reference angle $\theta_{hold}$ without any change. This is because the difference $\Delta\theta_w$ based on Expression (D3) is not calculated, that is, the value of the difference $\Delta\theta_w$ is "0," when it is determined that the turning wheels 16 are not in contact with an obstacle.

The reference angle calculator 93 calculates a final reference angle $\theta_{hold}1$ by performing a limiting process on the reference angle $\theta_{hold}$ based on the virtual end angle $\theta_e$ as expressed by the following expression (D5). This is for generating the curbstone axial force when the position of the steering wheel 11 or the position of the turning shaft 14 reaches the virtual end angle $\theta_e$. "GRD( )" in Expression (D5) denotes the limiting process.

$$\theta_{hold}1=GRD(\theta_{hold},\theta_e) \quad (D5)$$

The reference angle calculator 93 compares the value of the virtual end angle $\theta_e$ with the value of the reference angle $\theta_{hold}$. When the value of the reference angle $\theta_{hold}$ is greater than the value of the virtual end angle $\theta_e$, the reference angle calculator 93 limits the value of the reference angle $\theta_{hold}$ to the value of the virtual end angle $\theta_e$. When the value of the reference angle $\theta_{hold}$ is equal to or less than the virtual end angle $\theta_e$, the reference angle calculator 93 calculates the reference angle $\theta_{hold}$ calculated using Expression (D4) as the final reference angle $\theta_{hold}1$ without any change.

The final difference calculator 94 receives the final reference angle $\theta_{hold}1$ calculated by the reference angle calculator 93 and the steering angle $\theta_s$ calculated by the steering angle calculator 51. The final difference calculator 94 also receives the virtual end angle $\theta_e$ stored in the storage device of the control device 50 and the value of the flag F set by the determiner 90. The final difference calculator 94 calculates the difference $\Delta\theta$ between the final reference angle $\theta_{hold}1$ and the current steering angle $\theta_s$ as expressed by the following expression (D6).

$$\Delta\theta=\theta_s-\theta_{hold}1 \quad (D6)$$

The final difference calculator 94 calculates a final difference $\Delta\theta 1$ which is a final difference between the final reference angle $\theta_{hold}1$ and the current steering angle $\theta_s$, for example, by correcting the value of the difference $\Delta\theta_w$ depending on the following three cases (E1) to (E3).

(E1) Curbstone Determination is Not Performed

When it is determined that the turning wheels 16 are not in contact with an obstacle, that is, when the value of the flag F is "0," the final difference calculator 94 sets the difference $\Delta\theta$ calculated using Expression (D6) as the final difference $\Delta\theta 1$ without any change as expressed by the following expression (D7).

$$\Delta\theta 1=\Delta\theta \quad (D7)$$

(E2) Curbstone Determination is Performed

When it is determined that the turning wheels 16 are in contact with an obstacle, that is, when the value of the flag F is "1," the final difference calculator 94 corrects the difference $\Delta\theta$ calculated using Expression (D6) to a smaller value. For example, the final difference calculator 94 corrects the value of the difference $\Delta\theta$ to a value "½" or "⅓." The final difference calculator 94 sets the corrected difference $\Delta\theta 2$ as the final difference $\Delta\theta 1$ as expressed by the following expression (D8). This is for reproducing a slow increase of a reaction force with elastic deformation of tires when the turning wheels 16 are going to be additionally turned in the state in which the turning wheels 16 are in contact with an obstacle.

$$\Delta\theta 1=\Delta\theta 2 \quad (D8)$$

(E3) Curbstone Determination is Performed and End Determination is Performed

The final difference calculator 94 performs end determination of determining whether the rotational position of the steering wheel 11 reaches the limit position of the virtual operation range thereof, for example, by comparing the steering angle $\theta_s$ with the virtual end angle $\theta_e$.

When it is determined that the turning wheels 16 are in contact with an obstacle and it is determined that the rotational position of the steering wheel 11 reaches the limit position of the virtual operation range thereof, the final difference calculator 94 performs the following processes.

That is, the final difference calculator 94 corrects the difference $\Delta\theta$ calculated using Expression (D6) to a smaller value. For example, the final difference calculator 94 corrects the value of the difference $\Delta\theta$ to a value "½" or "⅓." The final difference calculator 94 temporarily sets the corrected difference $\Delta\theta 2$ as a first final difference $\Delta\theta 1$ as expressed by the following expression (D9).

$$\Delta\theta 1=\Delta\theta 2 \quad (D9)$$

As expressed by the following expression (D10), the final difference calculator 94 calculates a difference between the steering angle $\theta_s$ and the virtual end angle $\theta_e$ and temporarily sets the value of the calculated difference as a second final difference $\Delta\theta 1$.

$$\Delta\theta 1=\theta_s-\Delta\theta_e \quad (D10)$$

The final difference calculator 94 selects the larger value of the first final difference $\Delta\theta 1$ calculated using Expression (D9) and the second final difference $\Delta\theta 1$ calculated using Expression (D10).

The pre-limiting axial force calculator 95 calculates a pre-limiting axial force F21 based on the final difference Δθ1 calculated by the final difference calculator 94. The pre-limiting axial force calculator 95 calculates the pre-limiting axial force F21 using a limiting axial force map stored in the storage device of the control device 50.

Figure 5:
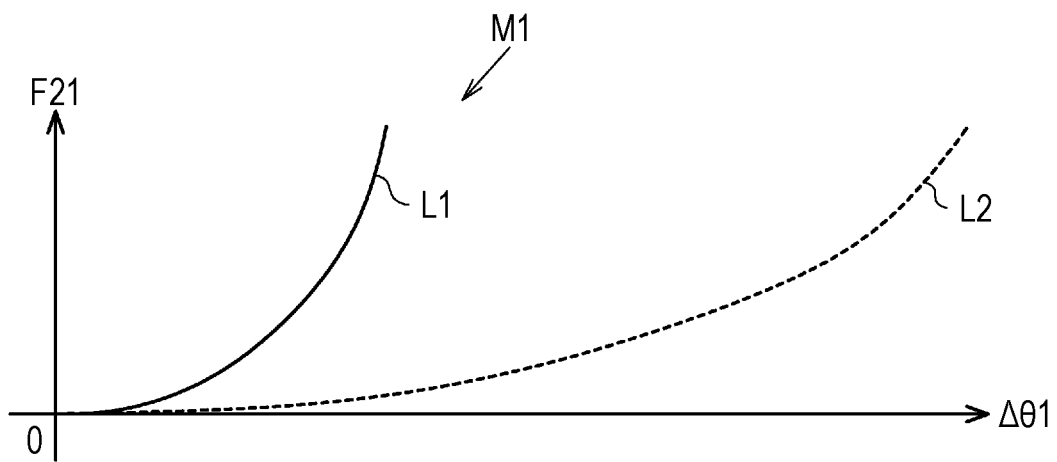
FIG. 5 is a graph illustrating a relationship between a final difference and a pre-limiting axial force according to the embodiment.

As illustrated in the graph of FIG. 5, the limiting axial force map M1 is a two-dimensional map with the horizontal axis set to the final difference Δθ1 and with the vertical axis set to the pre-limiting axial force F21. The pre-limiting axial force F21 has the following characteristics. That is, as indicated by a characteristics line L1, the value of the pre-limiting axial force F21 is set to a lager value as the value of the final difference Δθ1 becomes larger. A slope which is a rate of change of the pre-limiting axial force F21 with respect to the final difference Δθ1 increases gradually as the value of the final difference Δθ1 increases. That is, the characteristics line L1 is a curve having a positively increasing slop.

When it is determined that the turning wheels 16 are in contact with an obstacle (Case E2 and E3), the difference Δθ calculated using Expression (D6) is corrected to a smaller value. A relationship between the final difference Δθ1 at that time and the pre-limiting axial force F21 is the same as indicated by a characteristics line L2. The characteristics line L2 indicates a relationship between the final difference Δθ1 when it is assumed that the value of the difference Δθ calculated using Expression (D6) is not corrected to a smaller value and the pre-limiting axial force F21. The characteristics line L2 is a curve having a positively increasing slope. The slope of the characteristics line L2 is less than the slope of the characteristics line L1 as a whole. That is, when it is determined that the turning wheels 16 are in contact with an obstacle, the pre-limiting axial force calculator 95 calculates the pre-limiting axial force F21 using a limiting axial force map M1 in which the gradient of the characteristics line becomes slower by delaying the characteristics line L1 along the horizontal axis.

The pre-limiting axial force calculator 95 corresponds to an axial force calculator that calculates a limiting axial force (the pre-limiting axial force F21) for virtually limiting the operation of the steering wheel 11 according to the value of the final difference Δθ1.

The gain calculator 96 calculates a damping gain G based on the final difference Δθ1 calculated by the final difference calculator 94. The gain calculator 96 calculates the damping gain G using a gain map M2 stored in the storage device of the control device 50.

Figure 6:
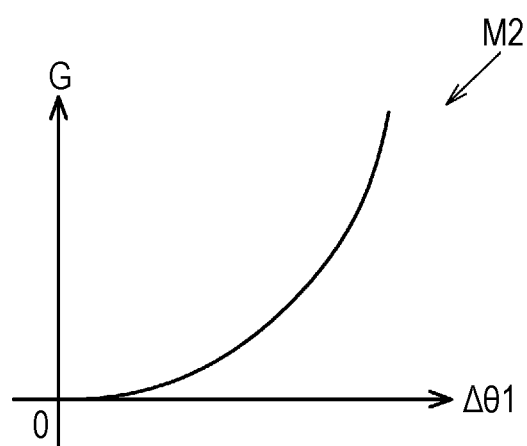
FIG. 6 is a graph illustrating a relationship between a final difference and a gain according to the embodiment.

As illustrated in the graph of FIG. 6, the gain map M2 is a map with the horizontal axis set to the final difference Δθ1 and the vertical axis set to the gain G. The gain map M2 has the following characteristics. The value of the pre-limiting axial force F21 is set to a larger value as the value of the final difference Δθ1 increases. A slope which is a rate of change of the gain G with respect to the final difference Δθ1 increases gradually as the value of the final difference Δθ1 increases.

The differentiator 97 receives the steering angle $\theta_s$ calculated by the steering angle calculator 51 and calculates a steering angular velocity $\omega_s$ by differentiating the received steering angle $\theta_s$. The multiplier 98 calculates a damping axial force F22 by multiplying the steering angular velocity $\omega_s$ calculated by the differentiator 97 by the gain G calculated by the gain calculator 96. The reason the damping axial force is calculated is as follows. That is, the value of the pre-limiting axial force F21 may change vibrationally with change of the value of the final difference Δθ1 as the gradient of change of the pre-limiting axial force F21 with respect to the final difference Δθ1 increases. Accordingly, the damping axial force F22 is calculated to stabilize the value of the pre-limiting axial force F21 with respect to the final difference Δθ1.

The adder 99 calculates the final limiting axial force F2 by adding the pre-limiting axial force F21 calculated by the pre-limiting axial force calculator 95 to the damping axial force F22 calculated by the multiplier 98.

Operations of Embodiment

Operations in this embodiment will be described below. When the operation position of the steering wheel 11 has not reached a position near the limit position of the operation range thereof or when the turning shaft 14 has not reached a position near the limit position of the physical movable range thereof, the limiting axial force calculator 82 does not basically calculate the limiting axial force F2. When it is determined that the turning wheels 16 are in contact with an obstacle, the limiting axial force calculator 82 does not basically calculate the limiting axial force F2. Accordingly, the base axial force F1 calculated by the base axial force calculator 81 is used as the final axial force F3. In this case, it is possible to apply a steering reaction force corresponding to vehicle behavior or a road surface state to the steering wheel 11 by reflecting the converted torque value T2* acquired by converting the final axial force F3 to a torque in the steering reaction force command value T*. A driver can ascertain the vehicle behavior or the road surface state by feeling the steering reaction force from the steering wheel 11 as a response.

When the operation position of the steering wheel 11 has reached to the limit position of the operation range thereof or when the turning shaft 14 has reached the limit position of the physical movable range thereof, the limiting axial force calculator 82 calculates the limiting axial force F2 as the end axial force corresponding to the final difference Δθ1. Accordingly, a value obtained by adding the limiting axial force F2 as an end axial force to the base axial force F1 is used as the final axial force F3. In this case, the steering reaction force increases rapidly by reflecting the converted torque value T2* acquired by converting the final axial force F3 to a torque in the steering reaction force command value T*. Accordingly, a driver has difficulty in operating the steering wheel 11 in a direction in which the absolute value of the steering angle $\theta_s$ increases. As a result, by feeling a sense of contact as the steering reaction force (a response), the driver can recognize that the steering wheel 11 has reached the limit position of the virtual operation range or the turning shaft 14 has reached the limit position of the physical movable range.

When additional turn steering or return steering is performed in the state in which the turning wheels 16 are in contact with an obstacle, the limiting axial force calculator 82 calculates the limiting axial force F2 as a curbstone axial force corresponding to the final difference Δθ1. Accordingly, a value obtained by adding the limiting axial force F2 as the curbstone axial force to the base axial force F1 is used as the final axial force F3. In this case, the steering reaction force increases rapidly by reflecting the converted torque value T2* acquired by converting the final axial force F3 to a torque in the steering reaction force command value T*. Accordingly, a driver has difficulty in performing additional turn steering or return steering. As a result, by feeling a sense of contact as the steering reaction force (a response), the driver can recognize that the turning wheels 16 are in contact with an obstacle such as a curbstone. In addition, the limiting axial force F2 as the curbstone axial force increases slowly with an increase of the final difference Δθ1 in comparison with the limiting axial force F2 as the end axial force. Accordingly, the driver can feel a response closer to an actual situation in which the turning wheels 16 are going to be additionally turned in the state in which the turning wheels 16 are in contact with an obstacle via the steering wheel 11.

Advantages of Embodiment

As a result, according to this embodiment, the following advantages can be achieved. One of the limiting axial force F2 as the curbstone axial force and the limiting axial force F2 as the end axial force is calculated based on the difference between the reference angle $θ_{hold}$ calculated depending on whether the turning operation of the turning wheels 16 is limited and the current steering angle $θ_s$. The limiting axial force F2 as the curbstone axial force is an axial force for limiting a new operation of the steering wheel 11 in the state in which the turning operation of the turning wheels 16 is limited. The end axial force is an axial force for limiting steering over the virtual end angle of the steering wheel 11. That is, a part calculating the limiting axial force F2 as the curbstone axial force and the limiting axial force F2 as the end axial force is shared. Accordingly, the process of adjusting the curbstone axial force and the end axial force is not required. Accordingly, it is possible to decrease the calculational load in comparison with a case in which the curbstone axial force and the end axial force are individually calculated.

When the turning wheels 16 are going to be additionally turned in the state in which the turning operation of the turning wheels 16 is limited, a reaction force increases slowly with elastic deformation of tires. When the turning operation of the turning wheels 16 is limited, the value of the final difference Δθ1 calculated by the final difference calculator 94 is corrected to a smaller value. Accordingly, it is possible to more slowly increase the steering reaction force. As a result, it is possible to apply a steering reaction force closer to an actual state in which the turning operation of the turning wheels 16 is limited to the steering wheel 11.

When the turning operation of the turning wheels 16 is limited and the rotational position of the steering wheel 11 has reached the limit position of the virtual operation range, the final difference calculator 94 uses the final difference Δθ1 of the larger value of the two final differences Δθ1 calculated for each case. Accordingly, it is possible to apply a steering reaction force corresponding to the final difference Δθ1 of the larger value to the steering wheel 11.

The value of the pre-limiting axial force F21 or the limiting axial force F2 may change vibrationally with change of the value of the final difference Δθ1 as the gradient of change of the limiting axial force F2 with respect to the final difference Δθ1 increases. In this regard, it is possible to stabilize the value of the pre-limiting axial force F21 or the final axial force F2 with response to the final difference Δθ1 by reflecting the damping axial force F22 in the pre-limiting axial force F21.

Even when the turning operation of the turning wheels 16 is limited, the turning wheels 16 may be slightly turned. In this regard, the steering angle $θ_s$ held by the steering angle holder 91 is corrected based on the amount of turning of the turning wheels 16. The reference angle $θ_{hold}$ is calculated based on the corrected steering angle $θ_s$. Accordingly, even when the turning wheels 16 are turned in the state in which the turning operation of the turning wheels 16 is limited, it is possible to apply a more appropriate steering reaction force to the steering wheel 11.

Other Embodiments

The embodiment may be modified as follows. The limiting axial force calculator 82 may employ a configuration in which the difference calculator 92 is omitted. In this case, the reference angle calculator 93 sets the curbstone-determination steering angle $θ_s1$ as the reference angle $θ_{hold}$ without any change.

The limiting axial force calculator 82 may employ a configuration in which the gain calculator 96, the differentiator 97, the multiplier 98, and the adder 99 are omitted. In this case, the pre-limiting axial force F21 calculated by the pre-limiting axial force calculator 95 is used as the final limiting axial force F2 without any change. The pre-limiting axial force calculator 95 corresponds to an axial force calculator that calculates the pre-limiting axial force F21 as the final limiting axial force F2 according to the value of the final difference Δθ1.

The final difference calculator 94 may not perform correction of decreasing the value of the difference Δθ between the reference angle $θ_{hold}$ and a current steering angle $θ_s$ at the time of curbstone determination. A clutch may be provided in the steering system 10. In this case, as indicated by a two-dot chain line in FIG. 1, the steering shaft 12 and the pinion shaft 13 are connected via a clutch 21. An electromagnetic clutch that performs transmission and cutoff of power by permitting or prohibiting supply of electric power to an excitation coil is employed as the clutch 21. The control device 50 performs engagement/disengagement control for switching the clutch 21 between engagement and disengagement. When the clutch 21 is disengaged, the power transmission path between the steering wheel 11 and the turning wheels 16 is mechanically cut off. When the clutch 21 is engaged, the power transmission path between the steering wheel 11 and the turning wheels 16 is mechanically set up.

The right and left turning wheels 16 may be independently turned. In this case, the control device 50 turns the turning wheels 16 by controlling turning motors provided in the turning wheels 16.

What is claimed is:

1. A steering control device that controls a reaction motor configured to generate a steering reaction force based on a command value which is calculated according to a steering state, the steering reaction force being applied to a steering wheel of which a power transmission path to and from a turning shaft that turns turning wheels is cut off, the steering control device comprising:
a processor that is configured to:
calculate a base axial force including an axial force in which a force acting on the turning shaft via at least the turning wheels is reflected when the steering wheel is operated in a predetermined operation range;
calculate a limiting axial force which is an axial force for virtually limiting an operation of the steering wheel; and
calculate a final axial force which is a final axial force to be reflected in the command value based on the base axial force and the limiting axial force,
wherein the processor is configured to hold a steering angle at a time of limiting a turning operation of the turning wheels when the turning operation is limited, wherein the processor is configured to calculate a reference angle by performing a limiting process of limiting the steering angle held to a virtual end angle when the turning operation of the turning wheels is limited, wherein the processor is configured to calculate the reference angle by performing the limiting process of limiting a current steering angle to the virtual end angle when the turning operation of the turning wheels is not limited, the virtual end angle corresponding to a limit position of a virtual operation range of the steering wheel, wherein the processor is configured to calculate a final difference which is a final difference between the reference angle and the current steering angle, and wherein the processor is configured to calculate the limiting axial force based on a value of the final difference.

2. The steering control device according to claim 1, wherein the processor is configured to correct the calculated value of the final difference to a smaller value when the turning operation of the turning wheels is limited.

3. The steering control device according to claim 1, wherein the processor is configured to use a larger of the final difference calculated based on a premise that the turning operation of the turning wheels is limited and the final difference calculated based on a premise that a rotational position of the steering wheel reaches the limit position of the virtual operation range when the turning operation of the turning wheels is limited and the rotational position of the steering wheel reaches the limit position of the virtual operation range.

4. The steering control device according to claim 1, wherein the processor is further configured to:
   calculate a damping gain for the limiting axial force based on the value of the final difference calculated; and
   calculate a damping axial force to be reflected in the limiting axial force by multiplying the damping gain calculated by a steering angular velocity.

5. The steering control device according to claim 1, wherein the processor is further configured to calculate a difference between a turning angle of the turning wheels at the time of limiting the turning operation of the turning wheels and a current turning angle when the turning operation of the turning wheels is limited,
   wherein the processor is configured to correct the steering angle held based on a value of the difference calculated when the turning operation of the turning wheels is limited and to calculate the reference angle by performing the limiting process on the corrected steering angle.

* * * * *